Sept. 10, 1957 G. F. H. VON STROH ET AL 2,805,760
TANDEM CONVEYOR
Filed April 1, 1955 4 Sheets-Sheet 4
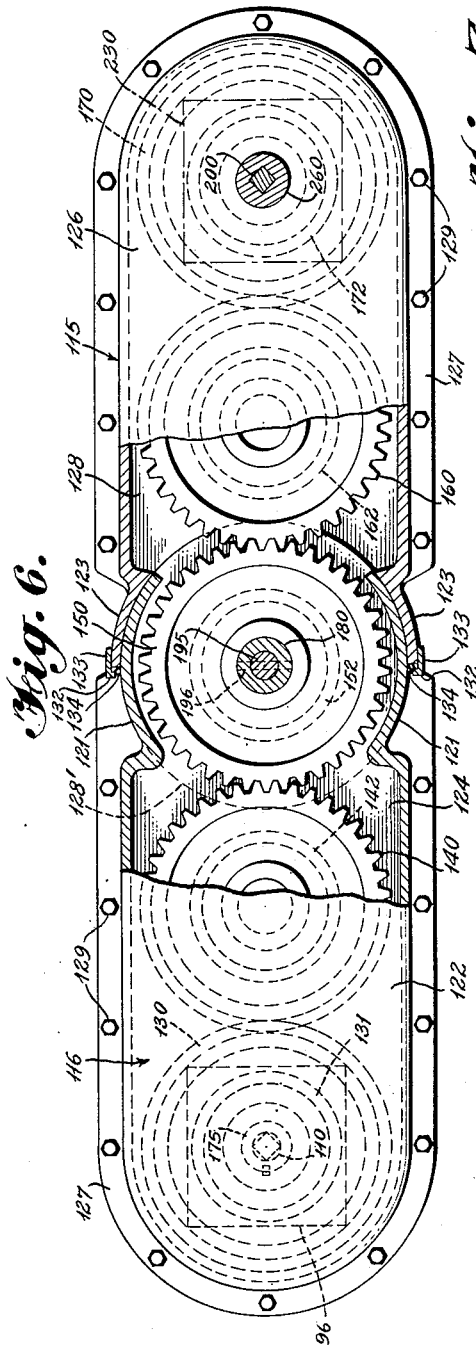
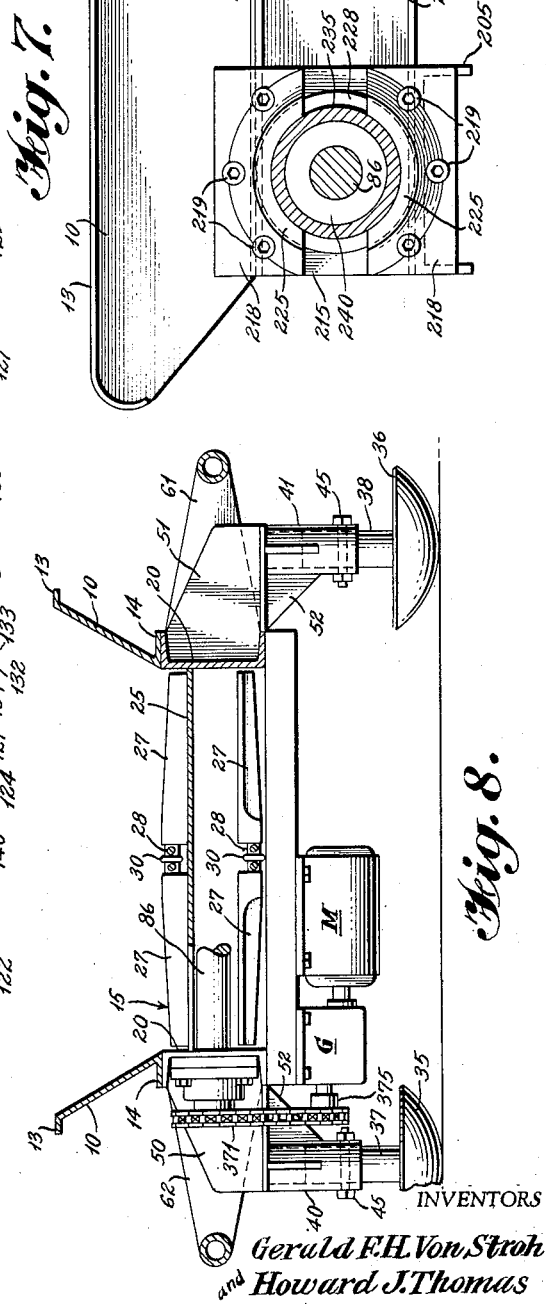
INVENTORS
Gerald F. H. Von Stroh
and Howard J. Thomas
BY
ATTORNEY

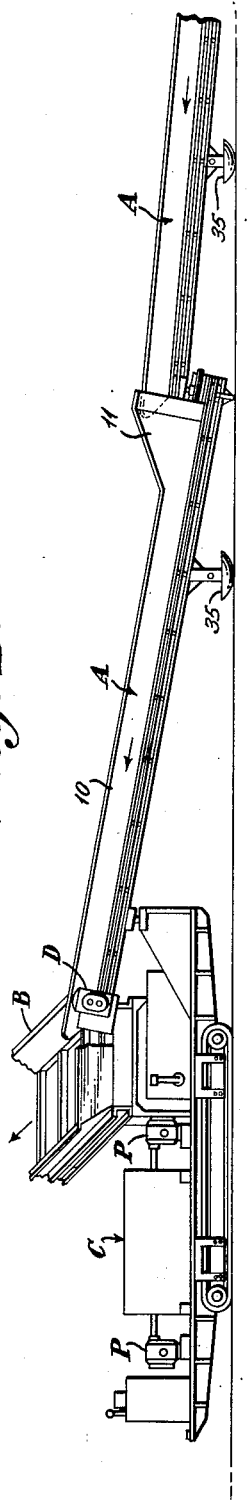
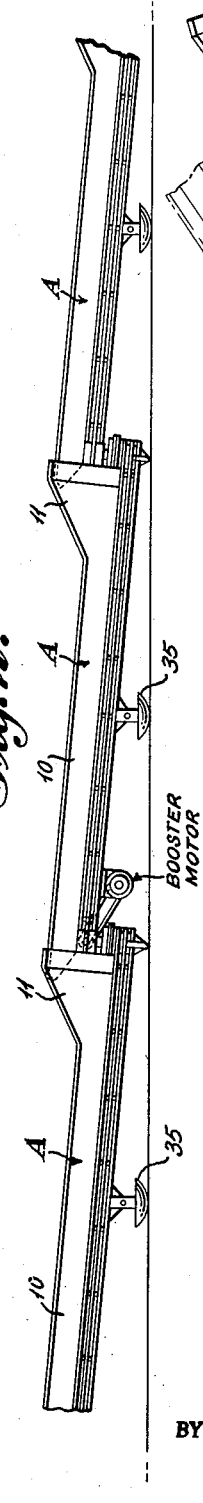
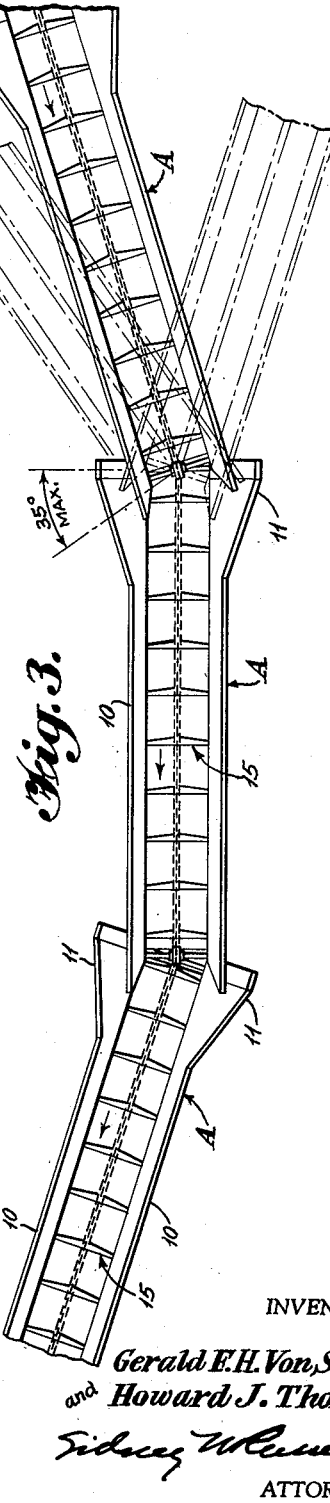

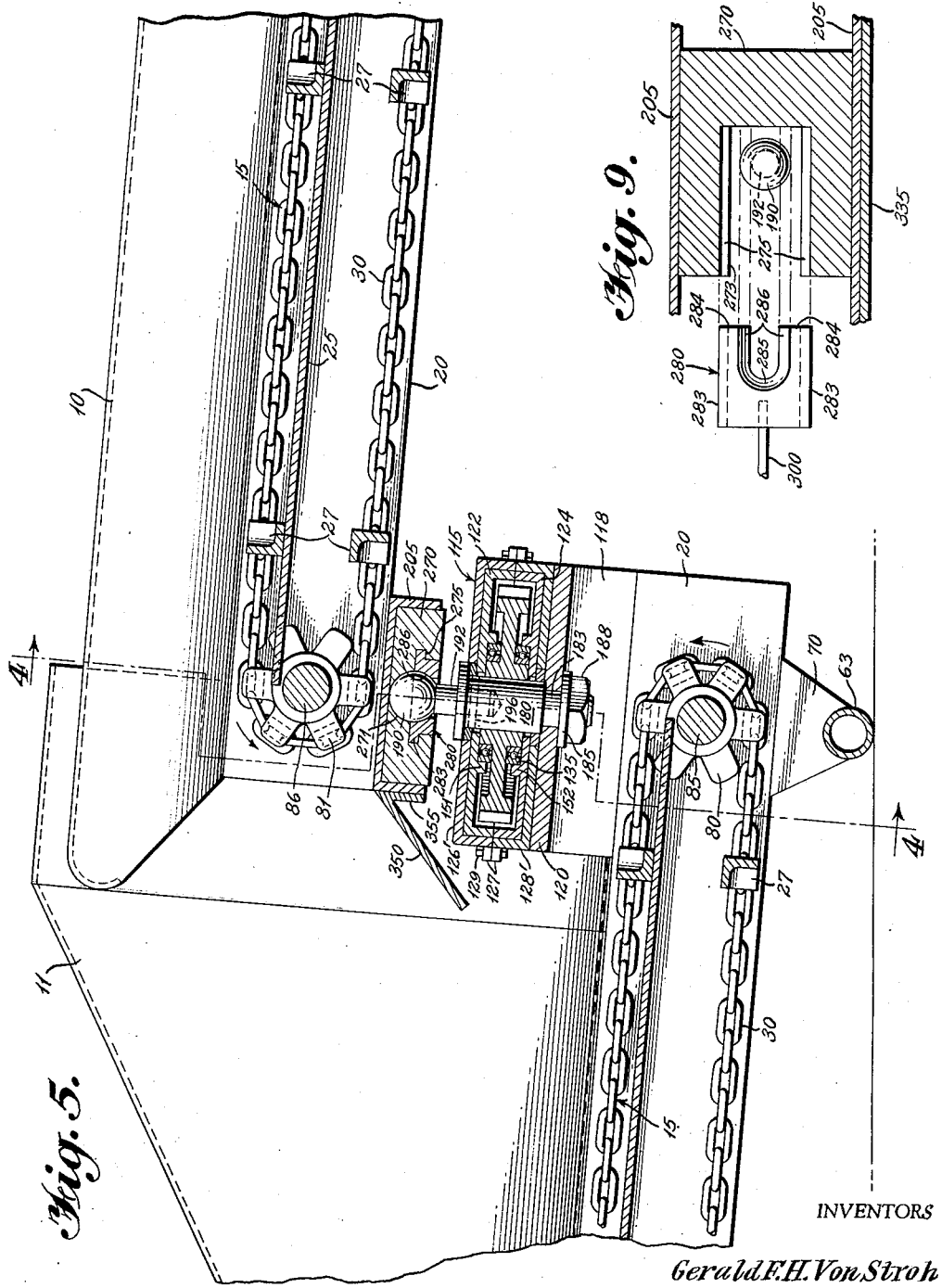

United States Patent Office 2,805,760
Patented Sept. 10, 1957

2,805,760

TANDEM CONVEYOR

Gerald F. H. von Stroh and Howard J. Thomas, Huntington, W. Va., assignors to Bituminous Coal Research, Inc., Washington, D. C., a corporation of Delaware Application April 1, 1955, Serial No. 498,534

12 Claims. (Cl. 198—92)

This invention relates to a tandem system for conveying materials and, more particularly, to the individual conveying units employed in such a system which are designed to be readily interlocked together and driven by a common power source. The invention is particularly suitable for use in the coal mining industry where flexibility, portability and ease of interconnection of several units in driving relationship are factors of the utmost importance.

Ordinary trough flight conveyor systems are, of course, well known. However, the common type of endless belt conveyor troughs exhibit many inherent disadvantages. By and large, each trough of such a system is separately driven or, if commonly driven, by means most cumbersome to use and extremely inefficient so far as portability, connection and interchangeability be concerned.

Prior devices are also inflexible and cumbersome to use in the sense that, if driven from a common power source, the manner of transmission of power to the required number of troughs is such that the individual units can not be displaced either laterally or vertically with respect to each other to any substantial degree without considerable effort, if at all. Also, the manner of interconnection and disassembly, where difficult and time-consuming, has detracted from the practical utility of such devices.

Our invention is unique in providing a common drive means which permits a simplified and effortless interconnection of a series of flight conveyors with no restriction as to the number which may be so employed except the limitations indicated by the output of the power supply.

Accordingly, it is an objective of this invention to provide a flight conveyor unit of the trough type which is fitted with a transmission mechanism of a nature that will readily permit attachment and detachment of a series of such units.

It is a further object of this invention to provide means for employing, in most instances, only one common power source, thereby substantially eliminating a multitude of fluid or electric motors for each individual unit used in the conveyor system.

An additional object of the invention is the provision of a connecting type of interlock mechanism by which the drive means and accompanying transmission incorporated therein can be quickly and easily connected or unconnected with respect to adjacent units.

A further object of the invention is to provide a system of conveying wherein such groups of conveyor units may be easily transported from place to place whether or not they are interconnected in large or small numbers.

Another object of the invention is the provision of such conveyor units which not only can be rapidly interlocked together, but also that represent, at the same time, a high degree of flexibility; here, reference is made to the fact that the interlock and accompanying transmission in each unit are so arranged and constructed that they do not interfere with movement of the individual units with respect to each other either laterally or vertically to a substantial degree. It is evident that where systems such as these are employed in coal mines, it must be possible to angularly incline each unit with respect to adjacent units, either vertically or laterally, so that the entire series can be positioned to follow the contour of the room or series of rooms without undue hindrance.

These advantages and objects of the invention will more fully appear from the following description made in connection with the accompanying drawings. Referring to the latter, like reference characters refer to similar parts throughout the several views. In these views:

Figure 1 is an elevation, largely diagrammatic view of the invention, illustrating its use in conjunction with a trammer, the latter being of a tractor type and having a common power source which is interconnected with the last in line of a series of conveyor units;

Figure 2 is a view similar to Figure 1 but illustrating further the employment of a booster motor in one of a series of conveyor units;

Figure 3 is a plan view, largely diagrammatic, indicating the side angles of inclination with respect to the lateral, as regards individual conveyor units, which may be obtained through the use of our invention;

Figure 5 is a detailed sectional view, taken on the line 5—5 of Figure 4;

Figure 6 is a plan view, partially in section, of the gear arrangement comprising part of the transmission assembly;

Figure 7 is a detailed view, partially in section, taken on the line 7—7 of Figure 4;

Figure 8 is an elevation view, partially in section, showing the manner in which a booster motor may be employed in conjunction with any one of several conveyor units; and Figure 9 is a detailed view of the slide assembly used in the interlock mechanism.

Figure 4:
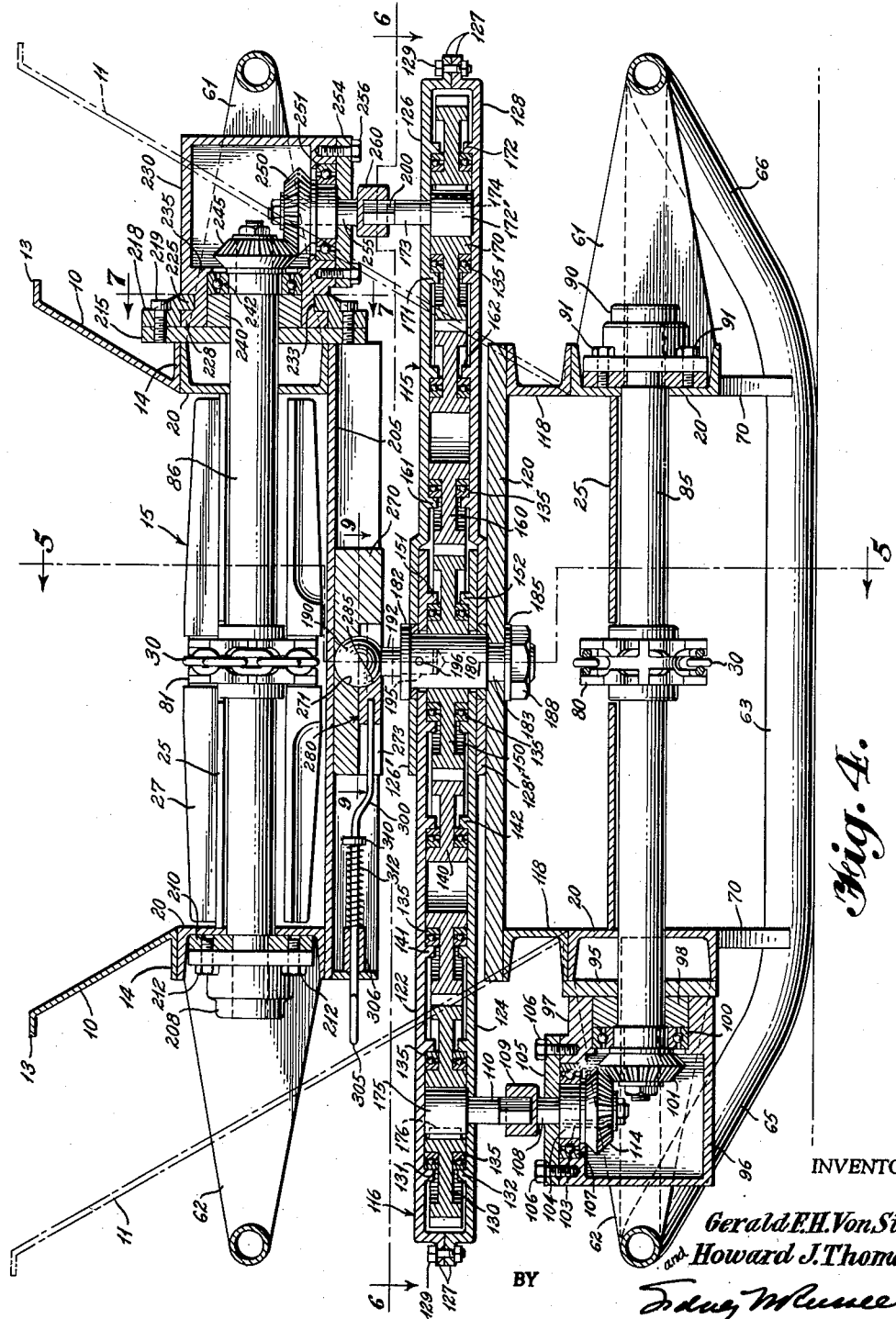
Figure 4 is a detailed view in cross section, taken on the line 4—4 of Figure 5, illustrating the transmission assembly interconnecting the inby end of one unit with the outby end of the adjacent unit, and further showing the manner of interlock of two adjacent conveyors.

Referring more particularly to the drawings, it is seen that the system includes not only the individual conveyor units generally indicated at A, but also an adjustable discharge conveyor B, here shown as surmounting the trammer and employed to discharge the conveyed materials to adjacent cars or other conveying means. All units, as stated, may receive their main power supply through power means placed upon the trammer, generally indicated at C. As indicated in Figure 1, the main drive, preferably a hydraulic motor D, is located at the outby end of the last in line of a series of conveyor units. Fluid pressure for operation of motor D is obtained from pumps P on the trammer. Such motor can be interconnected with the last of these units through a suitable transmission in any conventional manner, the particular means for doing so comprising no part of the instant invention.

Also, referring to this same figure (Figure 1), it is to be understood that, in referring to "forward" and "rear" units, or the forward end or rear end of an individual unit, "forward" would designate the unit on the right of this figure; the forward end of each unit being that end receiving the material from the source of supply; and the rear, that end nearest the trammer. The arrows in Figure 1 thus indicate direction of travel of the conveyed material.

In the preferred embodiment of our invention, as herein described, the several troughs include sides 10, the latter, at the inby end of each trough, being substantially enlarged upwardly so as to form flanges 11 substantially larger than the sides 10 just referred to. Such flanges are in the same planes as sides 10. The purpose of these enlarged ends or flanges 11 is to permit lateral or angular displacement of each unit with respect to its adjacent unit without involving spillage of the conveyed material as it passes from one conveyor to another. Such can be understood by reference to Figure 3 where both the forward and rear units are canted at a substantial angle laterally to the central unit. Each trough is, of course, fitted with a chain and flight conveyor generally indicated at 15 (Figure 3). Such will be referred to in more detail later.

It is also to be observed that the sides 10, which comprise the main portion of the trough, terminate in approximately parallel flanges 13 and 14 at the top and bottom thereof. The bottom flanges 14 rest upon main supporting beams or channel irons 20 positioned on each side of the unit. The flanges 14 and the upper flange of these channel irons 20 can be secured together in any well understood manner, as by welding.

The chain and flight assembly 15 rides upon a bed or plate 25 positioned in between the web of the two side channel irons 20 and above the midpoint thereof. The bed 25 is, of course, parallel to the floor and constitutes the main support for the conveyor system, there being no additional plate in this embodiment of the invention supporting the chain and flight arrangement on its return cycle.

The flights themselves are made up of angled units 27, greater in height at their midportion than at their respective ends. Each flight is segmented by a smaller partitioning element 28, the latter being suitable for interconnection with the drag link chain 30 used to propel the series of flights over the bed 25.

The frame of each conveyor unit described thus far is supported at, or somewhat near, the midpoint of the unit by two convex or dished slides 35 and 36 disposed on each side of each unit. In other words, these are positioned near the point of balance of the unit to facilitate handling thereof. The slides may be made unitary with their respective supporting stems 37 and 38. The latter are round in configuration and adapted to be received in a complementary bore of slightly greater diameter, disposed in downwardly extending tubular elements 40 and 41. Such tubular elements are suitably affixed to flanges 50 and 51, these flanges being directly attached in the desired position to each of the side channel irons 20, as shown in Figure 8. They may be further secured by triangular braces 52. As here shown, bolts 45 are employed to retain the stems 38 in the receiving bores in elements 40 and 41, above described.

Each of these conveyor units also has an additional supporting means at the inby or forward end thereof. Thus, referring particularly to Figure 4, it is seen that two additional braces 61 and 62, extending outwardly at right angles to the channel members 20, enable attachment of a bar or tube 63, bent near each of its ends upwardly as indicated at 65 and 66. In this position, it is secured, in any usual manner, to the ends of the two outwardly extending braces 61 and 62. Further rigidity may be lent to this supporting assembly by the addition of further braces 70, also suitably secured to the bottom flange of channel irons 20.

The structure just described permits sliding of each of the conveyor units along the surface as, for example, the floor of a room in a coal mine. The shape of brace or support 63 is such that when a unit is resting upon the floor, it will be held in an upright position.

Referring back to the chain and flight assembly 15, it is seen that the drag chain is propelled over two sprockets 80 and 81. As seen in Figure 4, sprocket 80 is located at the inby end of a rear conveyor and sprocket 81 at the outby end of its adjacent and forward conveyor. With respect to individual units, the construction described herein is the same in each instance, it being understood that sprockets 80 and 81 represent the forward and rear sprockets, respectively, in a given conveyor unit. As shown in Figures 4 and 5, however, only the forward portion of one conveyor and the rear portion of an adjacent, surmounting conveyor are illustrated.

Sprocket 80, or that drive sprocket located at the inby end of the rear conveyor, is keyed to a shaft 85, the latter piercing both channel irons 20 in a manner clearly illustrated in Figure 4. On one end of the shaft 85, and affixed to the channels 20 by bolts 91, is provided a suitable bearing 90 of any known or usual construction. On the opposite side, the shaft 85, positioned through a suitable aperture in plate 95 and passing through a bushing 98, is journalled in an antifriction bearing, as, for example, the ball bearing race 100. This is located within a collar 97 formed as a component part of gear case 96, the gear case containing interconnecting drive means for shaft 85 in the form of two meshing bevel gears. Thus, on this side of shaft 85, and keyed or otherwise suitably secured to it, is positioned a bevel gear 101. The gear box 96 is surmounted by a plate 105 also secured by bolts 106 to the box proper. Plate 105 is apertured to accommodate a stub shaft 108, the upper end of which is enlarged or bossed as at 109. The latter, as shown in Figure 4, is provided along its axis with an irregular or, as here indicated, a square opening for the reception of an additional stub shaft 110.

The shaft 108 is also suitably mounted in a like ball bearing race 107, set within an appropriate chamber formed in the upper portion of the gear box 96. This last named shaft 108 has keyed to it, by key 103, a bevel gear 114 of the same dimensions and characteristics as bevel gear 101 and adapted to be engaged in driving contact therewith.

The stub shaft 108, having an enlarged bearing surface 104, is mounted in suitable antifriction bearings 107. This entire bevel gear assembly is secured in place, as shown in Figure 4, by a series of bolts 106 which pass through plate 105 and which are threaded in the top wall of gear box 96.

Reference will now be made to the manner in which power obtained from shaft 85 is transmitted through a series of gears to the surmounting, driven conveyor unit located atop this transmission.

The transmission assembly is located within two interfitted housings, generally indicated at 115 and 116. Even though these two housings 115 and 116 can be angularly inclined with respect to each other, it is to be understood that housing 115 will retain the same relative position with respect to the inby end of the lower conveyor unit shown in Figure 4, whereas housing 116 can be rotated about its pivot point at a substantial angular inclination, with respect to a horizontal plane, to its companion housing. This, of course, permits angular deflection of the surmounting conveyor unit as shown in Figure 4 so that several units, when placed together, can be varied angularly with respect to each other as illustrated in Figure 3.

The only limitation as to this angularity with respect to the lateral is a practical one—the angularity must be within that amount which would not preclude effective transfer of conveyed material from one to another conveyor unit; in other words, the angularity would not exceed that which would permit spillage. We have found that the instant apparatus permits this lateral deflection up to 35° as indicated in Figure 3; and this, to all practical purposes in usage of the invention, is sufficient to accommodate such conditions of operation as would conceivably arise in the commercial application of the mechanism.

These two housings, and the apparatus used in conjunction with them, are superimposed upon the inby end of each conveyor unit. This is done by affording a supporting structure in the nature of two additional side channels 118, somewhat smaller in height than channels 20 and directly affixed to the latter by welding the lower flanges of channels 118 in the relative positions indicated in Figure 4.

Surmounting these two side channels 118 is a relatively strong supporting plate 120. The transmission unit, as will be obvious, is thus supported, and affixed to, this plate. Referring more particularly to the two separate transmission casings, it is seen that housing 116 is formed of two separate elements 122 and 124 joined together by a series of bolts 129 secured to the flanged rims 127 of each of the elements 122, 124. These upper and lower plates 122 and 124 terminate in a semicircular configuration 121, formed on each side, as shown in Figure 6. Similarly, the relatively movable housing 115 is also composed of two opposed plate members 126 and 128 secured in a like manner, through bolts 129 along the respective rims thereof, to each other. These two elements 126 and 128, forming housing 115, also terminate in two semicircular configurations 123 on each side of said elements. The curved portions 123 form the arc of a circle slightly larger than the circular periphery formed by the elements 121. The integration of this structure should be apparent. The semicircular configurations 121 are adapted to slide within the larger circular configurations 123.

In order to keep the transmission gearing substantially free of contamination, we prefer to employ means for sealing the contacting surfaces of the two curved elements 121 and 123. This takes the form of flanges 133 affixed to the larger, outer, curved portions 123, such flanges terminating in right angular extensions 132. Compressed in the groove formed by extensions 132 are located packing elements 134, the latter pressing against the inner circular configurations in sealing engagement in a well understood manner.

Although the two housings 115 and 116 are practically the same in all other respects, the elements 122, 124 of housing 116, and forming the top and bottom thereof respectively, are parallel to each other and spaced the same distance apart. In the case of housing 115, the two complementary top and bottom plates, plates 126 and 128, are separated a somewhat greater distance apart at the portions thereof near the pivot point of this housing. The separation or distance between these parallel plates is of sufficient amount to encase the plates of housing 116 therebetween. In this manner, housing 115 terminates in raised portions 126' and 128' which, as just described, are adapted to embrace the end portion of housing 116. Thus, so far as these two transmission housings 115 and 116 are concerned, it is seen that the structure of the casings thereof is such that housing 115 can rotate about its pivot point with respect to housing 116 at all times, even during operation of the transmission assembly.

In the preferred embodiment of the invention, as herein described, power is transmitted from stub shaft 110 through a series of five gears of equal size. These gears, as seen in Figure 4, are designated by the numerals 140, 150, 160 and 170. The gears are rotated in a series of annuluses or circular ribs formed upon the inner sides of each of the casing elements 122, 124, 126 and 128. For example, the hub of gear 130 is embraced by annulus 131 in plate 122 and also annulus 132 in plate 124. Similarly, the annuluses 141 and 142 embrace the hub of gear 140; ribs 151 and 152, the hub of gear 150; elements 161 and 162, the hub of gear 160; and curved members 171 and 172, the hub of gear 170. In between each of the hubs of these respective gears and the respective annuluses embracing the same are located antifriction bearings 135 of usual design, here shown as ball bearing races. It is thus apparent that this series of elements is adapted to transfer whatever torque is delivered to gear 130 through the series to gear 170, and that this can be accomplished although casing 115 is positioned or angled a substantial distance laterally about its pivot point.

Power is supplied to the initial gear of this gear train 130 through stub shaft 110. The latter terminates in an enlarged hub 175 and is keyed by key 176 to gear 130. Only the two end gears are keyed to drive shafts, the intermediate gears 140, 150 and 160 freely rotating within their respective ball bearing races, retained, as described above, by their respective series of circular rib formations. In any event, the last of the series in gear train, gear 170, is, like gear 175, keyed to an enlarged portion 172 of a stub shaft 173. The key is indicated at 174. The stub shaft 173 terminates in a squared end 200 adapted to engage a corresponding opening in the shaft supporting one of the bevel gears to be referred to hereinafter.

Housing 115 and the described gear elements contained therein may rotate about the central gear 150, such rotation or angular inclination to housing 116 being in the plane of the horizontal. Actually shaft 180, about which gear 150 rotates, is the pivot point for such movement. The various plates forming the two housings, such as plates 122, 124, 126 and 128, are all suitably apertured to receive shaft 180. The latter is reduced in diameter at its lower portion, as indicated at 183, and that portion extends through the supporting plate 120. Bushings 182 and 185 are placed on each end of the shaft to embrace the upper housing plate 126 and the supporting plate 120, as shown in Figure 4. This entire structure, including housing 116 and the related gear train, is then further maintained in place by an appropriate nut 188. This is tightened to a degree sufficient to retain the structure in position within desirable tolerances but insufficient to bind the two housings in such degree to reduce ease of movement of housing 115 with respect to casing 116.

The pivot shaft 180 also provides the support for a ball 190 of a ball and socket interlocking mechanism. This ball 190, having a stem 192, is threaded at one end and adapted to be screwed into an appropriate aperture 195 in the pivot shaft 180. When located at the desired position with respect to each other, the shaft 180 and ball are permanently maintained together by pin 196.

Referring to Figure 4, it will be recalled that the outby end of the conveyor unit is here shown with shaft 86 supported in the two side channels 20. At one end, the shaft is journaled in an appropriate bearing 208 secured against a bushing 210 by bolts 212. The two channels 20 are spaced a predetermined distance apart by a plate 205 fastened to the lower flange of each of them.

At the opposite end of shaft 86, a plate 215 is secured in place across the web of the adjacent channel 20. Secured to this shaft plate 215 is an additional plate 218, secured by the usual bolts 219 and having a spaced circular flange 225 which provides a channel between the plate 215 and the flange 225. The purpose of this construction is to secure the journal box 230, housing the bevel gears, to the conveyor frame in such manner that the conveyor unit can be raised or lowered vertically without interfering with the transmission of power through the series of gears described above. To this end, it is seen that the journal box 230 has a thickened portion 235 upon its side near the conveyor frame; this thickened portion is provided with a circular flange 228, to fit into the corresponding circular groove formed by the spaced flange 225 already referred to. Also, the thickened portion 225 is provided with a circular groove 233 to receive flange 225. The result is a double tongue-and-groove sliding arrangement which permits, as stated, the members 215 and 225, all secured to the conveyor assembly, to rotate on the horizontal axis of shaft 86, with respect to the journal box 230.

The shaft 86 is, of course, provided with a bevel gear 245, journaled in the usual type of antifriction bearing 242, the latter being spaced by a bushing 240 from the wall 215, previously described.

A complementary bevel gear 250, mounted upon a stub shaft 255, is adapted to engage gear 245 in a well understood manner. This stub shaft is provided with an enlarged end portion 260 having square openings therein to receive the squared end 200 of the adjacent stub shaft 173.

Bevel gear 250 likewise is journaled in suitable antifriction raceways 251 retained in place by a plate 254 secured by bolts 256 to the main body portion of the journal box 230.

It should here be noted that not only does the foregoing structure permit vertical tilting, either up or down, of the conveyor unit to a practically unlimited degree, but also that lateral deflection can be obtained without interfering with the drive assembly whatsoever. No matter in what direction the unit is angularly inclined laterally, or in a horizontal plane, the two bevel gears 245 and 250 will mesh in the same manner. Also, the drive assembly, irrespective of lateral or vertical deflection of adjacent conveyor units, will operate with the same degree of utility. These functions can be more readily understood by reference to Figure 4 where it will be appreciated that the right transmission housing 115 pivots about pivot 180 within the suggested limitation of 35° angularity thereto in a horizontal plane. Thus, when the superimposed conveyor unit is turned laterally, it will carry with it housing 115; such superimposed unit rides upon the ball 190 and employs such ball as a fulcrum or pivot point when angularity to the adjacent conveyor is desired. Such lateral deflection can be attained simultaneously with the raising or lowering of the preceding unit (or, as here shown, the superimposed unit) due to the construction heretofore described involved in making the conveyor frame slip-fitted, in a vertical plane, with the journal box 230.

It is thus to be appreciated that adjustment in both lateral and vertical planes may be accomplished with great ease by reason of the peculiar construction of this invention recited in the foregoing; such adjustment in vertical and horizontal angularity may even be made while the several units are being concurrently driven, one through the other, by a common power source.

Means have also been provided for engaging in locked relationship, and disengaging, the adjacent ends of conveyor units in a quick and efficient manner. The details shown in Figure 9 should here be referred to. A rectangular element 270 is attached to the underside of plate 205. At its center is a depression or concavity 271 in the shape of a half hemisphere. As seen in Figures 4 and 5, this same block 270 also has a slot 273 extending from one side approximately two-thirds through to the other side of the bottom portion thereof. At the upper portion of the slot, two opposed grooves 275 are provided (see Figure 5). This slot and these grooves are adapted to receive a slide member generally indicated at 280. This has two tongues 283 of a size permitting them to easily slide back and forth in the grooves 275 without binding. The slide 280 is actually U-shaped in formation, each of the sides 284 of the U being curved as at 286 to fit with some precision the contour of the ball 190. The U-shape, at the bottom portion of the U facing the ball and adapted to contact the latter, is also provided with a curved surface 285 approximating the spherical shape of the ball 190. It is thus seen that when the ball 190 is fitted into the hemispherical depression of block 270 and the slide 280 pressed against the lower surface of the ball (see Figures 4 and 5), the latter is necessarily maintained in contact with the spherical depression in block 270, being supported and retained by the two sides 284 of the U-shaped member 280.

A releasing mechanism for these several structures is also provided. This takes the form of the rod 300 which is screwed into or press fitted into the slide 280, extending to the side of the unit through a block 306. This rod has a handle 305 for manual operation thereof. As shown in Figure 4, a spring 312, pressing against a collar 310 mounted on the rod, urges the latter into the locked position or position shown in the referred to figures. However, on movement of the rod to the left (viewing Figure 4), the spring is compressed and the slide 280 consequently also moved to the left with a release of the ball 190.

The foregoing structure presents a simplified means for rapidly interconnecting or disassemblying several conveyor units. When connecting multiple units together, it is only necessary that stub shaft 173 be aligned with and fitted into the square opening in boss 260 of stub shaft 255. By positioning ball 190 in the hemispherical socket 271 in block 270, the interlocking mechanism becomes available to retain the two ends of adjacent conveyor units and the accompanying transmission equipment together in operative relationship. Conversely, in releasing the interlocking mechanism, the ball readily slips from place when the slide 280 is withdrawn and the superimposed conveyor unit raised upwardly; it follows also that the interconnecting shaft 173 is similarly placed out of use by this upward movement.

Where a relatively large number of conveyor units are employed, it may be desirable to use an additional booster power supply. Such a unit can be placed upon any one of the intervening conveyors, preferably at the outby end thereof as shown in Figure 2. Referring to Figure 8, such a booster receives power from a motor M. The latter is generally geared down through a transmission G which supplies torque to a sprocket 375, the latter delivering power through a chain drive 371 to shaft 86. As stated, a booster arrangement of this nature would find use on, for example, the third or fourth conveyor unit from the main power supply located on the trammer. Also, it is quite apparent that the power means could be either hydraulic or electric. In any event, the application of a booster power supply, as herein shown, would not interfere with the mobility, flexibility and interlocking character of the mechanism comprising this invention.

It is evident that many variations are possible within the scope of this invention. However, it is not intended that the same be limited in any manner except by the scope of the appended claims.

We claim:

1. In a flight conveyor unit adapted to be readily connected and disconnected in power transmitting relationship with adjacent, like units, a forward chain and flight assembly supporting shaft and a rear chain and flight assembly supporting shaft, means to drive said rear shaft whereby said forward shaft is driven by said chain, said means including a gear train on the forward end of said unit, one side of said gear train being interconnected to said forward shaft, the other side of said gear train having a power take-off shaft for interconnection with the rear shaft of an adjacent conveyor unit, a socket engaging ball centrally of said gear train, a gear assembly in engagement with said rear drive shaft rotatable vertically with respect to said unit, and a ball engaging and disengaging interlock adjacent said rear drive shaft.

2. In a flight conveyor unit adapted to be readily connected and disconnected in power transmitting relationship with adjacent, like units, a forward chain and flight assembly supporting shaft and a rear chain and flight assembly supporting shaft, means to drive said rear shaft whereby said forward shaft is driven by said chain, said means including a gear train on the forward end of said unit, one side of said gear train being interconnected to said forward shaft, the other side of said gear train having a power take-off shaft for engagement with the rear shaft of an adjacent conveyor unit, said gear train being pivoted at the central portion thereof whereby said one side may be pivoted with respect to the other side, a socket engaging ball centrally of said gear train, a gear assembly in engagement with said rear drive shaft rotatable vertically with respect to said unit, and a ball engaging and disengaging interlock means adjacent said rear drive shaft.

3. In a flight conveyor unit adapted to be readily connected and disconnected in power transmitting relationship with adjacent, like units, a forward chain and flight assembly supporting shaft and a rear chain and flight assembly supporting shaft, means to drive said rear shaft whereby said forward shaft is driven by said chain, said means including a bifurcated gear train on the forward end of said unit, one side of said gear train being interconnected to said forward shaft, the other side of said gear train having a vertically disposed power take-off shaft, separate housings for each of said sides, said housings and said sides being movable laterally in a horizontal plane with respect to each other, a socket engaging ball centrally of said gear train, a gear assembly in engagement with said rear drive shaft rotatable vertically with respect to said unit, a ball engaging and disengaging interlock means near said rear shaft for engagement and disengagement with an adjacent conveyor unit, said interlock means including a ball receiving socket, means to maintain said ball in said socket comprising a slide means adapted to be removably positioned against a lower surface of said ball.

4. In a flight conveyor unit adapted to be readily connected and disconnected in power transmitting relationship with adjacent, like units, a forward chain and flight assembly supporting shaft and a rear chain and flight assembly supporting shaft, means to drive said rear shaft whereby said forward shaft is driven by said chain, said means including two interconnected housings on the forward end of said unit, said housings being interconnected and movable laterally with respect to each other, a gear train in said housings pivoted at the point of interconnection of said housings, one side of said gear train being interconnected to said forward shaft, the other side of said gear train having a vertically disposed power take-off shaft, a socket engaging ball centrally of said gear train, a gear assembly in engagement with said rear drive shaft rotatable vertically with respect to said unit, and a ball engaging and disengaging interlock means near said rear shaft for engagement and disengagement with an adjacent conveyor unit.

5. In a flight conveyor unit adapted to be readily connected and disconnected in power transmitting relationship with adjacent, like units, an elongated frame, a trough on said frame, forward and rear chain and flight supporting shafts journaled in said frame, means to drive said chain supporting shafts including a transmission, said transmission comprising an odd number of gears forming a gear train, the central gear of said gear train providing a pivot about which the gears on one side thereof may move angularly in a horizontal plane, the other side of said gear train being interconnected to said forward shaft, said one side of said gear train having a vertically disposed power take-off shaft, said other side being movable laterally with respect to said one side, a socket engaging ball centrally of the gear train, a bevel gear assembly on said rear drive shaft, a gear box containing a second bevel gear in engagement with said first bevel gear, said gear box being rotatable vertically with respect to the frame, said second bevel gear being in selective engagement with said take-off shaft, and a ball engaging and disengaging interlock means near said rear shaft for engagement and disengagement with an adjacent conveyor unit, whereby said unit may be driven while disposed angularly with respect to the horizontal.

6. In a flight conveyor unit adapted to be readily connected and disconnected in power transmitting relationship with adjacent, like units, an elongated frame having a conveyor trough thereon, forward and rear chain supporting shafts on said frame, a drag chain and endless flight assembly mounted for conveyor motion on said shafts, a gear transmission at the forward end of said unit, said transmission comprising an odd number of meshed gears disposed in the same plane, the central of said gears providing a pivot for the gears on one side of said transmission, means in association with said forward shaft to drive the transmission including power take-off means on said side of the transmission, a gear box containing a gear drive in interconnection with said rear shaft, said gear drive having power take-off interconnecting means, and means permitting rotation of said gear box about the axis of said rear shaft whereby said unit may be driven by an adjacent unit while angularly disposed to the horizontal.

7. In a flight conveyor unit adapted to be readily connected and disconnected in power transmitting relationship with adjacent, like units, an elongated frame having a conveyor trough thereon, forward and rear chain supporting shafts on said frame, a drag chain and endless flight assembly mounted for conveyor motion on said shafts, a gear transmission at the forward end of said unit, said transmission comprising an odd number of meshed horizontally disposed gears, the central of said gears providing a pivot for the gears on one side of said transmission, means in association with said forward shaft to drive the transmission including power take-off means on said side of the transmission, a gear box containing a gear drive in interconnection with said rear shaft, said gear drive having power take-off interconnection means, means for quick interconnection of said unit with said drive means including a socket engaging ball positioned above said central gear, a ball engaging and disengaging interlock means near said rear drive shaft, and means permitting rotation of said gear box about the axis of said rear shaft whereby said unit may be driven by engagement with an adjacent unit while angularly disposed with respect to the horizontal.

8. In an endless flight conveyor system, a series of units having forward and rear flight drive shafts, means to drive each of said rear shafts by interconnection thrrough an adjacent unit including a gear train on the forward end of each unit, one side of said gear train being interconnected to said forward shaft, the other side of said gear train having a vertically disposed power take-off shaft, a socket engaging ball centrally of said gear train, a gear assembly in engagement with said rear drive shaft rotatable vertically with respect to an adjacent unit, said gear assembly of one unit being in engagement with said power take-off shaft of an adjacent unit, and an interlock for engagement and disengagement with said ball of an adjacent conveyor unit.

9. In an endless flight conveyor system, a series of units having forward and rear flight drive shafts, means to drive each of said rear shafts by interconnection through an adjacent unit including a gear train on the forward end of each unit, said gear train being bifurcated at the central portion thereof to form two housings movable angularly with respect to each other, one side of said gear train being interconnected to said forward shaft, the other side of said gear train having a vertically disposed power take-off shaft, a socket engaging ball centrally of said gear train, a gear assembly in engagement with said rear drive shaft rotatable vertically with respect to an adjacent unit, said gear assembly being in engagement with said power take-off shaft, and an interlock near said rear drive shaft for engagement and disengagement with said ball of an adjacent conveyor unit.

10. In an endless flight conveyor, a series of units having forward and rear flight drive shafts, means to drive each of said rear shafts by interconnection through an adjacent unit including a gear train on the forward end of each unit, one side of said gear train being interconnected to said forward shaft, the other side of said gear train having a vertically disposed power take-off shaft, said other side of said gear train being mounted in pivotal relationship with and in the same plane as said one side, a socket engaging ball centrally of said gear train, a gear assembly in engagement with said rear drive shaft rotatable vertically with respect to an adjacent unit, said gear assembly of one unit being in engagement with said power take-off shaft of an adjacent unit, and an interlock for engagement and disengagement with said ball of an adjacent conveyor unit.

11. In an endless flight conveyor, a series of units having forward and rear flight drive shafts, means to drive each of said rear shafts by interconnection through an adjacent unit including a gear train on the forward end of each unit, one side of said gear train being interconnected to said forward shaft, the other side of said gear train having a vertically disposed power take-off shaft, a socket engaging ball centrally of said gear train, a bevel gear on each of said rear drive shafts, a gear box containing a second bevel gear mounted for rotation about a horizontal axis with respect to an adjacent unit, said second bevel gear being in engagement with said power take-off shaft of an adjacent unit, and an interlock for engagement and disengagement with said ball of an adjacent conveyor unit.

12. In an endless flight conveyor system, a series of units having forward and rear flight drive shafts, drag chain and flight assemblies mounted for conveyor motion on said shafts, means on each of said units to drive each of said rear shafts by interconnection with an adjacent one of said units, said means including a gear transmission at the forward end of each of said units, said transmission comprising an odd number of meshed horizontally disposed gears, the central of said gears providing a pivot for the gears on at least one side of said transmission, power take-off means on said side of the transmission for intreconnection with said rear shaft of an adjacent unit, means for quick interconnection of each of said units to an adjacent unit including a socket engaging ball positioned above said central gear and an interlock means near said rear drive shaft for maintaining said ball in locked position with respect to an adjacent unit, a bevel gear on each of said rear drive shafts, a gear box containing a second bevel gear mounted for rotation about a horizontal axis with respect to an adjacent unit, said second bevel gear being in engagement with said power take-off shaft of an adjacent unit, whereby said units may be interconnected for receiving power from a common power source and each of said units is tiltable vertically and rotatable horizontally with respect to adjacent units during conveyor operation.

References Cited in the file of this patent

UNITED STATES PATENTS

| | | |
|---|---|---|
| 485,099 | Fulton | Oct. 25, 1892 |
| 2,182,139 | Speno | Dec. 5, 1939 |
| 2,370,147 | Clarkston et al. | Feb. 27, 1945 |
| 2,722,409 | Bergmann | Nov. 1, 1955 |